United States Patent
Scott et al.

(10) Patent No.: US 7,996,282 B1
(45) Date of Patent: Aug. 9, 2011

(54) METHOD AND SYSTEM FOR SELECTING AND DISPLAYING ITEMS

(75) Inventors: Sean M. Scott, Sammamish, WA (US); Douglas J. Gradt, Seattle, WA (US); Doug Irvine, Seattle, WA (US); Nimrod Hoofien, Seattle, WA (US); Eva Manolis, Bellevue, WA (US); Amy Bates, Seattle, WA (US); Max L Kanter, Seattle, WA (US); Todd A Heimes, Seattle, WA (US); J. Nathaniel Sloan, Seattle, WA (US); Michael Paul Touloumtzis, Seattle, WA (US); Michael L. Weiss, Maple Valley, WA (US); Maren Marie Costa, Seattle, WA (US); Gianna Lise Puerini, Bellevue, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1073 days.

(21) Appl. No.: 11/694,675

(22) Filed: Mar. 30, 2007

Related U.S. Application Data (63) Continuation-in-part of application No. 11/540,933, filed on Sep. 29, 2006, now Pat. No. 7,603,367.

(51) Int. Cl.
*G06Q 30/00* (2006.01)
*G06F 17/30* (2006.01)
(52) U.S. Cl. ............ 705/27.2; 705/27.1; 707/752
(58) Field of Classification Search .......... 705/26, 705/27, 26.1, 27.1, 27.2; 707/152, 752
See application file for complete search history.

(56) References Cited

U.S. PATENT DOCUMENTS

| | | | |
|---|---|---|---|
| 5,187,776 | A | 2/1993 | Yanker |
| 5,754,850 | A * | 5/1998 | Janssen ............ 707/758 |
| D395,426 | S | 6/1998 | Chiba |
| D403,313 | S | 12/1998 | Peppel |
| 5,889,517 | A | 3/1999 | Ueda et al. |
| D418,120 | S | 12/1999 | Okura et al. |
| D418,495 | S | 1/2000 | Brockel et al. |
| D427,574 | S | 7/2000 | Sawada et al. |
| 6,101,480 | A | 8/2000 | Conmy et al. |
| 6,268,854 | B1 | 7/2001 | Borden et al. |
| 6,288,702 | B1 | 9/2001 | Tachibana |
| 6,320,602 | B1 | 11/2001 | Burkardt et al. |
| D459,360 | S | 6/2002 | Leon et al. |
| D470,857 | S | 2/2003 | Anderson et al. |
| D474,778 | S | 5/2003 | Barnes |
| 6,678,891 | B1 | 1/2004 | Wilcox et al. |

(Continued)

OTHER PUBLICATIONS

Girishankar, S., "Build the E-Commerce Catalog—New Content-Management Tools Bring Together Disparate Data Formats and Item Descriptions," InformationWeek, 74, Nov. 1999.*

(Continued)

*Primary Examiner* — Nicholas D Rosen
(74) *Attorney, Agent, or Firm* — McCormick, Paulding & Huber LLP (57) ABSTRACT

Methods and systems for causing the display of items for the review and selection thereof by a potential purchaser has a plurality of search tools whereby a customer can select certain search criteria for displaying items corresponding to the search criteria for review and selection thereof and comparison therebetween. In one embodiment, the system provides a brand menu whereby a customer can select one or more brands of products for displaying the same in a common display window.

15 Claims, 7 Drawing Sheets

U.S. PATENT DOCUMENTS

| | | | |
|---|---|---|---|
| 6,798,630 | B1 | 9/2004 | Del Vecchio et al. |
| RE38,609 | E | 10/2004 | Chen et al. |
| D513,511 | S | 1/2006 | Decombe |
| 6,983,420 | B1 | 1/2006 | Itou et al. |
| 7,058,902 | B2 | 6/2006 | Iwema et al. |
| D528,553 | S | 9/2006 | Nevill-Manning et al. |
| D528,556 | S | 9/2006 | Decombe |
| D529,036 | S | 9/2006 | Koch et al. |
| D529,037 | S | 9/2006 | Koch et al. |
| D529,509 | S | 10/2006 | Stabb |
| D529,920 | S | 10/2006 | Nevill-Manning et al. |
| D530,336 | S | 10/2006 | Thomsen |
| D534,543 | S | 1/2007 | Gusmorino et al. |
| D541,291 | S | 4/2007 | Zhou et al. |
| D546,336 | S | 7/2007 | Vong et al. |
| D548,743 | S | 8/2007 | Takahashi et al. |
| D554,652 | S | 11/2007 | Shen et al. |
| D554,654 | S | 11/2007 | Waldeck |
| 7,551,187 | B2 | 6/2009 | Agrawala |
| 7,580,867 | B2 | 8/2009 | Nykamp |
| 7,603,367 | B1* | 10/2009 | Kanter et al. ........................ 1/1 |
| 7,676,759 | B2 | 3/2010 | Carter |
| 7,882,156 | B2* | 2/2011 | Wykes et al. ................. 707/812 |
| 2002/0042755 | A1* | 4/2002 | Kumar et al. ................... 705/26 |
| 2002/0087558 | A1* | 7/2002 | Bailey et al. ..................... 707/10 |
| 2002/0138481 | A1* | 9/2002 | Aggarwal et al. ................ 707/6 |
| 2003/0046700 | A1 | 3/2003 | Wilcox et al. |
| 2003/0050844 | A1* | 3/2003 | Ruppelt et al. ................. 705/26 |
| 2003/0090474 | A1 | 5/2003 | Schaefer |
| 2003/0169302 | A1 | 9/2003 | Davidsson et al. |
| 2004/0083239 | A1* | 4/2004 | Cookson et al. .............. 707/200 |
| 2004/0117271 | A1* | 6/2004 | Knight et al. ................... 705/27 |
| 2006/0064652 | A1 | 3/2006 | Ahokas |
| 2006/0179027 | A1* | 8/2006 | Bechtel et al. ................. 706/45 |
| 2006/0184613 | A1* | 8/2006 | Stienessen et al. ........... 709/203 |
| 2006/0291738 | A1 | 12/2006 | Gong |
| 2009/0064018 | A1 | 3/2009 | Horvitz |
| 2009/0132943 | A1 | 5/2009 | Minsky |

OTHER PUBLICATIONS

Smith, A., "New Look for Solid Modeling, A," Computer-aided Engineering, vol. 15, No. 4, pp. 19-24, Apr. 1996.*

Finnegan, F., "Questions and Answers: Windows," Microsoft Systems Journal, vol. 7, No. 2, p. 103, Mar.-Apr. 1992.*

Coates, J., "The Chicago James Coates Computers column," Knight-Ridder Tribune Business News—Chicago Tribune—Illinois, Feb. 20, 2006.*

Onlineshoes, onlineshoes.com, Jan. 2007.

Screenshot from the Office for Harmonization in the Internal Market website, (http://oami.europa.eu/RCDOnline/RequestManager) dated Mar. 25, 2008 (2 pages).

* cited by examiner

| Women's Shoes | Men's Shoes | Kids' Shoes | Handbags |

Search [Women's Shoes ▼] [                ] [GO]

Narrow By Clear all selections 29 results          Show Only: ☐ Sale ☐ Newest arrivals 131 [Standard view] [Brand view] ←—129

Category Clear categories ▼
Women's Shoes > Sandals
☐ Ankle-Strap
  Ankle-Wrap
☐ Dress
  Fisherman
☐ Platform BANDOLINO
shop this brand —133          showing 1-3 of 25

137 ◀    76A   76B   76C
         Bandolino  Bandolino Panda  Bandolino
         Venema Sandal  Sandal       Klemens Sandal
135      $68.95    $68.90          $68.90
         141       143             145        139 ▶

Brand ▼
Find a brand: [    ]

☐ BCBGirls
☐ BCBGMAXAZRIA
☐ Betsey Johnson
☐ Beverly Feldman
■ Bill Blass
☐ Birkenstock
☐ Bite
  Bivel
☐ Bongo 131
BLASS
BILL BLASS
shop this brand —133

Currently selected brands:
■ Bandolino
■ Bill Blass
■ Bruno Magli showing 1-2 of 3

Color Family:
Select color(s):
[color swatches grid]

Bill Blass Salieri    Bill Blass Blaire
Open Toe Wedge        Open Toe
Sandal                Slingback
$73.95                $68.95

Size:
Select size(s):
[3] [3.5] [4] [4.5] [5]
[5.5] [6] [6.5] [7] [7.5]

Width:
Select width(s):
[4A] [3A] [2A] [B] [C/D]

Bruno Magli
shop this brand showing 1-1 of 1

Heel Height:
Select heel height(s):
☐ Under 1"
☐ 1" - 1 3/4"
☐ 2" - 2 3/4"
☐ 3" - 3 3/4"
☐ 4" & Over Bruno Magli Raios
Sandal
$184.95

Price
Select price range:
[▐——————▐]
$20            $185

METHOD AND SYSTEM FOR SELECTING AND DISPLAYING ITEMS

CROSS REFERENCES TO RELATED APPLICATIONS

This application is a continuation-in-part of co-pending U.S. patent application Ser. No. 11/540,933, filed Sep. 29, 2006, entitled: "Method And System For Displaying Attributes Of Items Organized In A Searchable Hierarchical Structure", which is incorporated herein by reference in its entirety.

TECHNICAL FIELD

This disclosure relates generally to methods and systems for displaying items and, more particularly, to a method and system for facilitating item selection and for displaying items.

BACKGROUND

It is now commonplace for consumers (or clients or customers or shoppers or buyers) to purchase goods or products from on-line (or e-commerce or Internet-based) retailers (or merchants). A large number of on-line retailers have set up on-line Internet web sites where consumers can shop for the products (or items or goods) that are available for sale, purchase the products desired and have the products delivered to them. These products may be tangible goods, such as groceries, books, CDs, DVDs, tools, clothes, footwear, health/beauty items, hardware, or any other tangible goods that are physically delivered to the customer, or "digital" goods, such as electronic books, music, movies/videos, application software, or any other digital product that is downloaded, copied, transmitted or otherwise electronically transferred to the customer.

To find a desired product to purchase, a customer will often perform a search using search tools available on a merchant website. The search results are typically displayed as a list of products that are related in some way to the search criteria. The customer then selects (or clicks on) a desired product in the list, which causes the website to display details of the selected product, including the product specifications, characteristics, features and/or images of the product. After reviewing the product details, the customer may either buy the product or return to the search results list to select another product to review. If there are two or more products that have similar features, the customer must typically either remember which product has which features, print out a copy of a feature list for each product being compared, or switch back and forth between product detail screens to compare the products. This comparison/selection process can be cumbersome and inefficient and often leads to buyer frustration that may greatly diminish the on-line shopping experience. Further, buyer frustration increases the likelihood that the customer may look to another on-line merchant as the source of products in the future.

Further, the search tools often include pull-down menus or other types of selection devices wherein one or more options are offered each pertaining to a certain feature of the products being reviewed. Typically, a user can select one of the available options thereby causing a display of the available products including only those products having the feature identified by the user selection. If the user decides he/she would like to look at those products having a second one of the selectable features, the product selection tool must again be used to select the option corresponding to the second feature whereby the display is updated to include only those available products having the second feature. To compare the products resulting from the searches having the first and second options respectively, a user would need to print out the various search results or flip back and forth between the windows corresponding to the respective searches.

Similarly, many currently used websites provide search tools directed to the price ranges of available products. Typically such price range selectors display a list of increasing/decreasing price ranges which are user selectable to review all of the available products in the selected price range. For example, price ranges selectors usually offer selectable ranges of prices such as: 0-$50, $50-$100, $100-$200, etc., or similar incrementally increasing or decreasing ranges of prices which are separately selectable. Thus, in this example, if a user wants to review all of the available products less than $200, he/she must separately select each of the above-identified options and separately review the products displayed in each price range in subsequently displayed windows.

Therefore, the current techniques for assisting on-line shoppers when various related items on a list need to be reviewed and compared can be inefficient, frustrating and lead to lost sales and loss of repeat business for the merchant. Accordingly, it would be desirable to have a system or method for assisting shoppers that overcomes the limitations and inefficiencies of the conventional approaches, that among other potential benefits provides a more efficient way of displaying search results and/or makes it more convenient and efficient to purchase goods on-line when the customer desires to compare various products before making a purchase, thereby improving the on-line shopping experience with the on-line merchant.

SUMMARY

According to an embodiment of the present disclosure, a method for causing the display of a plurality of products for customer review and comparison is provided. The method including causing the display of a product selection tool including the display of a group of features associated with at least a portion of a plurality of available products, accepting a customer selection of two or more of the features, identifying a portion of the available products based on the customer selection, causing the display of an image of each of the products of the portion of the available products, and updating the display of the plurality of product selection tools including identifying the customer selections associated therewith.

For example, when customer Sally is shopping for women's shoes, a search results list returns 4,987 shoes displayable on 50 separate results web pages including 100 images per page. When Sally selects two of her favorite brands of women's shoes in a certain category such as sandals using a product selection tool, the search results are reduced to the number of sandals available in the two selected brands and the resulting images including those of both brands are displayed in a single window sorted in accordance with Sally's selected sort preferences or a default ordering if no selection is made. Thus, Sally can view images of both of the selected brands of shoes in the same display window.

In another aspect, the disclosed method includes causing the display of at least one sorting tool whereby a customer can select a sort preference for the displayed products.

Further, the disclosed method includes updating the display of at least one of a plurality of product selection tools according to the product characteristics of the portion of available products identified in response to a customer selection associated with another of the product selection tools.

Thus, each time a portion of the available products is identified in response to a customer selection via one of the product selection tools, the display of all other product selection tools is updated corresponding to the selected products.

For example, if Sally selects only black and brown shoes using a color family selector tool, the brand menu is updated to indicate which brand names offer via the merchant website shoes in either black or brown. Thus, if the Adidas® brand shoes available do not include any styles of shoes available in either black or brown then the brand name menu will include the brand name Adidas® in phantom or otherwise identified as not available and Sally will not be able to select the brand name Adidas® when seeking black or brown shoes. Alternatively, if Sally first selects the brand name Adidas® in the brand menu, then the color family selector will be updated accordingly to indicate that black and brown shoes are not available.

The present disclosure provides a method and system for, among other benefits, efficiently displaying the availability of products and product features that meet the customer's needs. The disclosure allows the customer to select two or more features of a product type and view the resulting available products and product features in real time on the web page, without having to switch between separate web pages for each of the products or features. Further, the disclosure allows the customer to adjust the selection of features and see the availability of products having those features in real time. The user interface is easy to navigate and makes it easy to keep track of which items are being viewed and selected.

The foregoing and other objects, features and advantages of embodiments of the present disclosure will become more apparent in light of the following detailed description of exemplary embodiments thereof.

DETAILED DESCRIPTION

Figure 1:
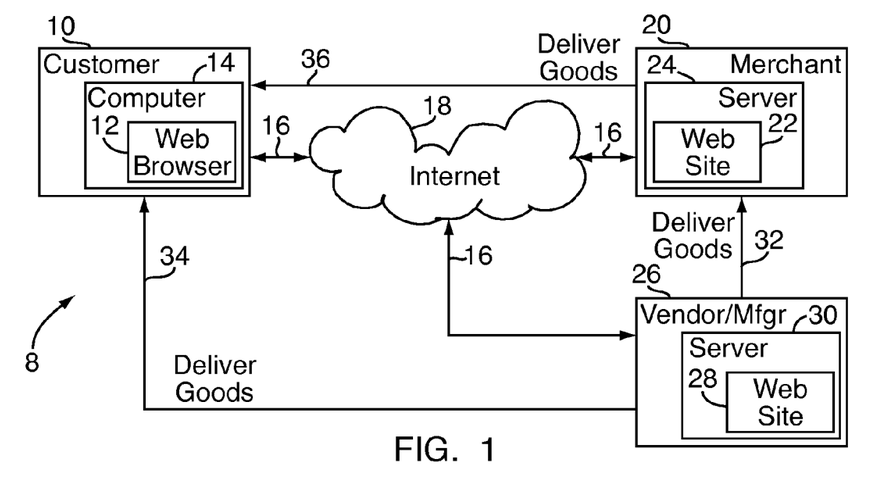
FIG. 1 is a block diagram of the components of a customer-merchant shopping system, in accordance with embodiments of the present disclosure.

FIG. 1 illustrates the principal components of an embodiment of a customer-merchant on-line ordering system 8, which includes a customer 10 (or consumer or client or shopper or buyer) and an on-line (or e-commerce or Internet-based) merchant (or supplier or retailer or seller or reseller or distributor) 20. The customer 10 can be any entity or individual that wishes to review or purchase goods (or products) or services from the on-line merchant 20. The customer 10 uses a web browser 12 running on a computer 14. The merchant 20 is an entity that sells products from a merchant website 22 which is implemented using one or more physical computer servers 24. The customer computer 14 is connected to or communicates with the merchant server 24 through a communications network 18, such as the Internet, as indicated by lines 16, by sending and receiving of digital data over the communications network 18. The customer 10 uses the web browser 12 as a user interface to view and/or communicate with the merchant website 22 that is displayed on the customer computer 14 allowing the customer 10 to interact with the merchant website 22.

In addition, one or more of the goods ordered by the customer 10 may be made by or obtained from one or more third party vendors (or manufacturers) 26. Also, the merchant 20 may be the vendor 26. The vendor 26 is an entity that manufactures goods or has access to goods that the merchant 20 desires to supply to the customer 10 and may sell the goods to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired goods to either the merchant 20 or to the customer 10, as indicated by the lines 32,34, respectively. If the goods are delivered to the merchant 20 from the vendor 26, the merchant 20 delivers the goods to the customer, as indicated by a line 32. There may be more than one vendor 26 that supplies goods to the merchant 20 and/or the customer 10.

The computers, servers, and the like described herein have the necessary electronics, software, memory, storage, databases, firmware, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" or "vendor" refers to the associated computer systems operated or controlled by a merchant or vendor, respectively. Thus, process steps described as being performed by the "merchant" or the "vendor", may be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could alternatively be used to perform certain operations. Process steps described as being performed by a "customer" are typically performed by a human operator via the computer 14, but could, alternatively, be performed by an automated agent.

The customer 10 may use any web-enabled or client-server based applications, such as the web browser 12, or any other web-enabled applications or features including email, or other messaging techniques to communicate with (or connect to) the merchant web site 22 and/or server 24 through the communications network 18. In addition, the computer 14 may be any of a number of computing devices that are capable of communicating over the network, including but not limited to set-top boxes, personal digital assistants, mobile phones, digital media players, Web pads, tablets, laptop computers, desktop computers, electronic book readers, game consoles, and the like. The protocols and components for providing communication between the customer computer 14 and the merchant website 22 and/or server 24 are well known to those skilled in the art of computer communications and thus, need not be described in more detail herein.

The data and/or computer executable instructions, programs, software and the like described herein may be stored on a computer-readable medium that is within or accessible by the customer computer 14 and/or the server 24, having sequences of instructions which, when executed by a processor (or CPU), cause the processor to perform all or a portion of the functions and/or methods described herein. Such computer executable instructions, programs, software and the like may be loaded into the memory of the customer computer 14 or the server 24, using a drive mechanism associated with the computer readable medium, such as a floppy drive, CD-ROM drive, DVD-ROM drive, network interface, or the like.

In order to make purchases, the customer 10 typically browses through product information concerning goods (or products) or services available for purchase from the on-line merchant 20. After selecting a product or products that the customer 10 wishes to purchase, a product order is sent to the merchant 20. The product order is placed via a communication from the web browser 12 to the web site 22 operating on the server 24 of the merchant 20, which includes payment by the customer 10 to the merchant 20 for the goods. The merchant 20 then delivers the goods to the customer 10 as indicated by the line 36. Alternatively, the vendor 26 may deliver the goods directly to the customer 10 as indicated by the line 34.

Although one common application, described herein, for selection of items involves selecting products for purchase, the embodiments described herein can be used for many other applications. For example, the items may be selected for the purpose of rental, subscription, viewing or some other form of consumption.

Figure 2:
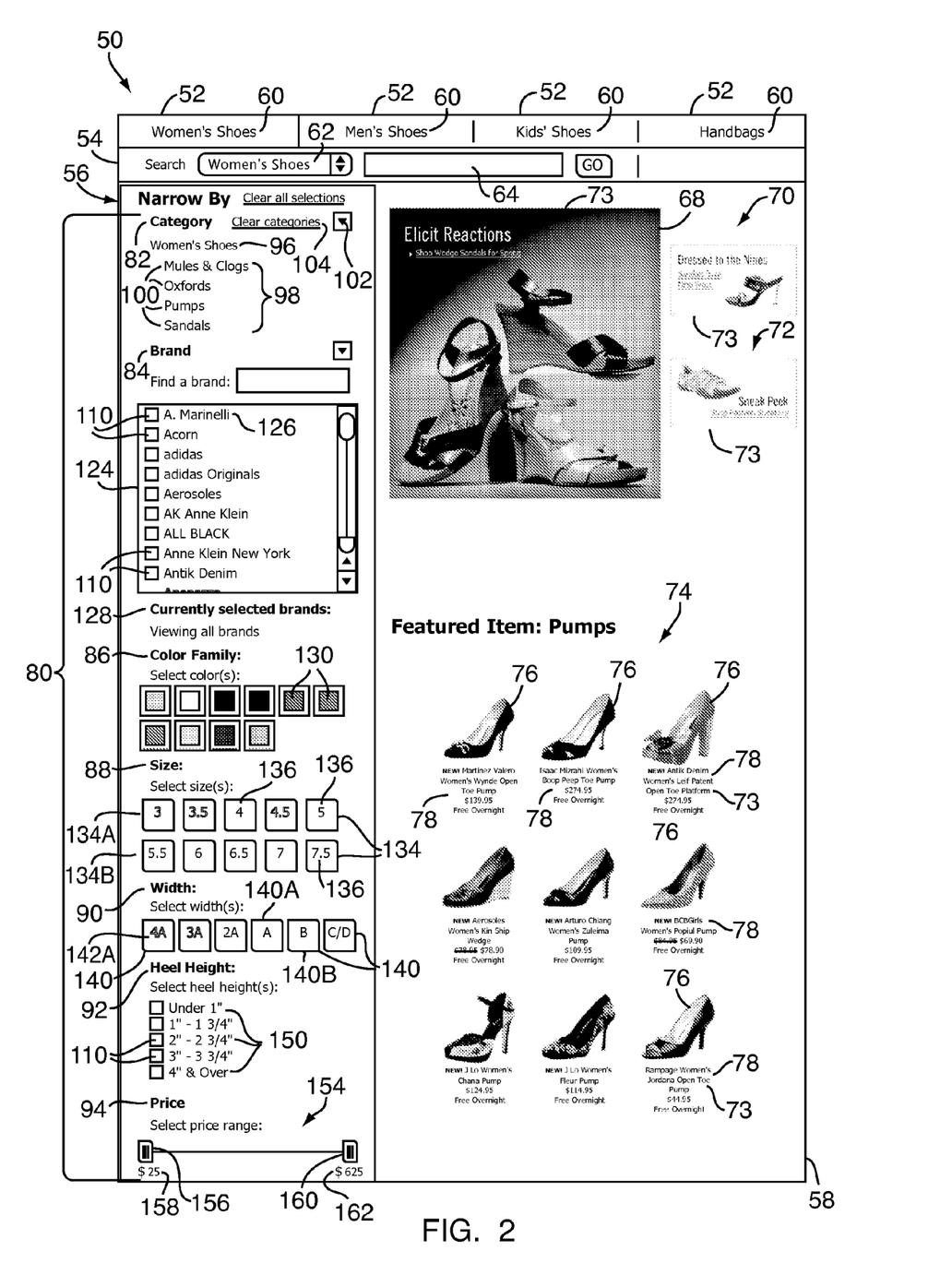
FIG. 2 is an illustration of one embodiment of a product selection screen in accordance with the present disclosure.

Referring to FIG. 2, one embodiment of a graphical user interface (GUI) for use by the customer 10 in selecting products for purchase from the merchant 20 via the web site 22 includes a product selection screen 50. Generally, the product selection screen 50 includes a plurality of product buttons 52 which identify various types of products offered for sale on the web site 22, a product search bar 54, a filter window 56 and a display window 58. In the FIG. 2 embodiment, the filter window 56 and display window 58 are separate windows, however, in other embodiments of the present invention, the filter window and display window can be displayed in a common window. Also, in the illustrated embodiment, the products featured on the website 22 and discussed with respect to the product selection screen 50 are women's shoes. However, the scope of the disclosure is not limited in this regard as the system and method of the present disclosure can be utilized in connection with the marketing and sales of many other types of products as will be readily apparent to one skilled in the art.

The product buttons 52 each include the name or other indicia 60 identifying a type of product offered for sale on the website 22. As shown in the FIG. 2 embodiment, the product buttons 52 include the names "Women's Shoes", "Men's Shoes", and "Kids' Shoes" respectively, which provide the indicia 60 thereon. The product buttons 52 are selectable by the customer 10 via a mouse click for displaying products of the designated type on product selection screens linked to the respective product buttons 52 which are similar to the product selection screen 50 featuring women's shoes.

The search bar 54 includes a pull-down menu 62 and text box 64 whereby the customer 10 can search the website 22 for the products offered thereon. Typically, the website 22 is searched for the type of product selected in the pull-down menu 62 based on specific features of a sought-after product identified using key words entered in the text box 64 by the customer 10 via the computer 14. A "GO" button 66 is selectable via a mouse click to initiate the search once the key words have been entered. Although not shown in FIG. 2, the pull-down menu 62 identifies selectable product identifiers corresponding to each of the product types included in the product buttons 52. Additionally, the pull-down menu 62 may include selectable product identifiers corresponding to various subsets of the products offered on the website 22 including "Sale" or "Clearance" products, as well as various holiday-related products, and other groups of products.

In a normal state, prior to a user-initiated search and/or product selection, the display window 58 includes a plurality of advertisement displays (68, 70, 72, 74) wherein certain products or product types are featured via images and/or text. Typically, each advertisement display (68, 70, 72, 74) includes a link 73 to an address (URL) of a page of the website 22 featuring the advertised products.

The advertisement display 74, which is directed to a currently featured item, namely "Pumps" (FIG. 2) includes a plurality of product images 76 and associated product descriptions 78 of various styles of "Pumps" offered for sale on the website 22. Each of the product descriptions 78 typically defines a link 73 to the address (URL) of a page of the website 22 directed to the advertised product. The links 73 are normally identifiable via underlined or otherwise highlighted text or images either in a normal view of the advertisement display 74 or when a cursor (not shown) is pointed to or positioned adjacent a selected product image 76 or product description 78.

Apart from the normal state, the display window 58 is dynamic and updated in real time in response to a product or brand selection, or a search criteria entry initiated by the customer 10. The display window 58 and features thereof are discussed further herein following.

Still referring to FIG. 2, the filter window 56 includes a plurality of user interfaces including product selection tools 80 wherein a customer 10 can select and/or input search criteria or features related to a product or product type for narrowing a search of the products available for sale on the website 22. In the illustrated embodiment, the product selection tools 80 include: a category menu 82; a brand menu 84; a color family table 86; a size table 88; a width table 90; a heel height table 92; and a price range selector 94. In other embodiments of the product selection screen 50, the filter window 56 may include other search or sorting tools which are directed to features of a particular product or product type selected.

The interactive interfaces for the color, size and width attributes described herein are similar to that described in co-pending U.S. patent application Ser. No. 11/619,998 filed Dec. 29, 2006, entitled "Method and Systems for Selecting Item Variations for Display in User Interfaces", which is incorporated herein by reference in its entirety.

The category menu 82 includes a product type identifier 96 which displays the name corresponding to the type of product selected in the pull-down menu 62 and/or via the product buttons 52. Following the product type identifier 96, the category menu 82 includes an alphabetically arranged category list 98 of selectable category identifiers 100 corresponding to the designated product type. The category identifiers 100 are selectable individually via a mouse click whereby all products available on the website 22 in the selected category are displayed in the display window 58. A user-operable category display button 102 is provided to turn on/off the display of the category list 98. The category menu 82 also includes a "clear category" selector 104 which clears all selected category identifiers 100 upon operation thereof.

In some embodiments of the present disclosure, the various category identifiers 100 are selectable separately such that the display window 58 provides a product image 76 and/or product description 78 for each of the products available on the website 22 in the identified category. Alternatively, the various category identifiers 100 can be selected in combination, wherein more than one of the category identifiers 100 are selectable such that the display window 58 includes a product image 76 and/or product description 78 for each of the products available on the website 22 in each of the categories selected. According to some embodiments, unless sorted otherwise, the product images 76 and/or product descriptions 78 for a next category are displayed on the display window 50 in one or more horizontal rows following one or more horizontal rows of product images 76 and product descriptions 78 of the products in a prior category wherein the categories are displayed in the order they appear in the category list 98.

Figure 3:
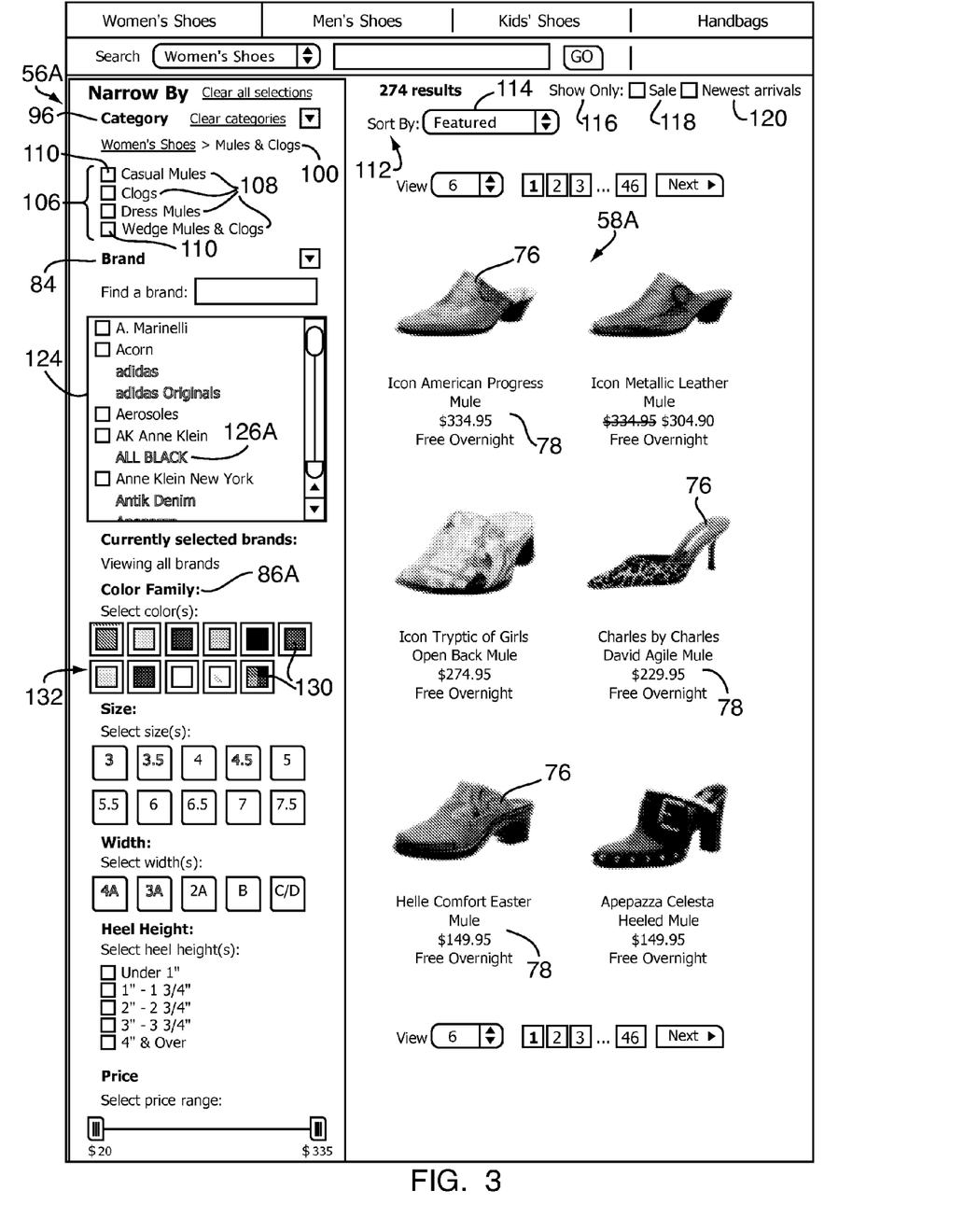
FIG. 3 is an illustration of another embodiment of a product selection screen in accordance with the present disclosure illustrating the display of a selected category of products available for purchase.

Referring to FIG. 3, upon selection of a category identifier 100 (e.g., Mules & Clogs) both of the filter window 56 and display window 58 of FIG. 2 are updated in real time to reflect the current selections. For example, in the FIG. 3 embodiment, each of the filter window 56A and display window 58A have been updated to reflect the category selected, namely "Mules & Clogs". Upon selection of the Mules & Clogs category identifier, the server 24 accesses a product database on the merchant server for women's shoes that are available for purchase from the merchant website 22 and sorts the same returning only those women's shoes which are classifiable as either mules or clogs.

The updated display window 58A includes a product image 76 and product description 78 for each of the shoes identified in the search including all women's shoes included on the website 22 which are classifiable as a "mule" or "clog". The display window 58A also provides a sort bar 112 including a pull-down menu 114 whereby a customer 10 can select the order in which the displayed products are arranged. For example, in one embodiment, the pull-down menu 114 includes the selections: "Featured", "Best selling", "Newest arrivals", "Price: high to low", and "Price: low to high". Thus, the displayed results can be arranged in a customer defined order directly from the display window 58A using the sort bar 112.

Additionally, the display window 58A includes a filter bar 116 wherein a customer 10 can limit the results displayed by selecting a sort button such as "show only—sale items" button 118 or "show only—newest arrivals" at button 120 directly from the display window 58A. In other embodiments of the display window 58A, the filter bar 116 can include sort buttons for other sort criteria wherein a customer 10 can limit the results to those products he/she is most interested in viewing.

As set forth above, the display window 58A is dynamic and updated in real time upon a user selection of one of the product search tools 80 disposed in the filter window 56A as well as any of the sort or filter controls provided in the display window 58A. For example, upon selection of the "Best selling" selection in the sort bar 112, the display window 58A is automatically updated to re-order the displayed shoes based on the number of pairs sold for each style of shoes in the selected group.

Still referring to FIG. 3, the updated filter window 56A displays the product type identifier 96, namely "Women's Shoes" as well as the selected category identifier 100, namely, "Mules & Clogs". Additionally, a subcategory list 106 is displayed including an alphabetical list of subcategory identifiers 108. In the illustrated example, the subcategory identifiers 108 describe various types of mules and clogs such as "casual mules", "dress mules", etc. Each of the subcategory identifiers 108 includes an associated selection box 110 disposed adjacent thereto. The subcategory identifiers 108 are each user-selectable via a mouse click using the associated selection box 110 or by designating a selected one of the subcategory identifiers 108 using a mouse pointer (not shown) and subsequent mouse click via the computer 14 as is well known in the art. One or more of the subcategory identifiers 108 are selectable for displaying only the women's shoes in the selected subcategories in the display window 58A. Upon selection of a subcategory identifier 108, the filter window 56A and display window 58A are updated in real time to reflect the selections made.

Still referring to FIG. 3, the brand menu 84 identifies certain brand names 126 shown in phantom or a lighter font such as the brand name 126A, namely, "ALL BLACK" indicating the brand as not selectable since there are no "Mules & Clogs" available through the web site 22 sold under the brand name "ALL BLACK". Upon customer selection of any of the product attributes or features provided via the product selection tools 80 to narrow a search of the products available through the web site 22, the remaining product search tools 80 and sorting tools are similarly updated in accordance with the customer selection(s) and the products available. For example, if a customer 10, sets the price range selector 94 to search for shoes having a maximum cost of $100, and all of the AK Anne Klein shoes available through the web site 22 have a retail or sale price more than $100, then the brand menu 84 will be updated in real time in response to the customers price range selection, to display the brand name 126 for "AK Anne Klein" in phantom or light font so that the customer 10 cannot select this brand and knows that AK Anne Klein brand shoes are not available for a cost of $100 or less. Additionally, the display window is also updated in real time to display only those shoes available through the web site 22 that have a retail or sale price of $100 or less. All of the remaining product selection tools 80 are similarly updated in accordance with the customer selection via the price range selector 94 and any other customer selections.

Referring again to FIG. 2, the brand menu 84 includes a brand name list 124 including an alphabetical listing of each of the brand names 126 of women's shoes available on the website 22. A selection box 110 disposed adjacent each brand name 126 in the brand name list 124 is selectable via a mouse click to identify the brands of shoes to be displayed in the display window 58. Alternatively, using a mouse pointer (not shown) operable via the computer 14, the customer 10 can select a brand name 126 included in the brand name list 124 by directing the mouse directly on the brand name 126 icon and clicking on the same. To deselect a selected brand name 126, a second mouse click on the selection box 110 or brand name 126 icon will deselect the brand and cause the display window 58 and filter window 56 to be updated accordingly.

Additionally, the brand menu includes a selected brands list 128 which displays an alphabetically arranged list of those brand names 126 which have been selected and currently displayed. As shown in FIG. 2, the selected brands list 128 displays the terms "Viewing all brands" as no brand names 126 have been selected.

Upon selection of a brand name 126 to be displayed, both the filter window 56 and display window 58 are updated in real time to reflect the customer selections made via one of the search tools 80 or the sort tools provided in the display window 58. For example, if a user selects the brand "adidas" for the product type "Women's shoes" and no other search criteria has been entered, the server 24 controls the display window 58 to display all styles of women's shoes which carry the Adidas® label and are available on the website 22. The selected brand list 128 would also be updated simultaneously with the filter window 56 to identify only the selected brand Adidas®.

One convenient feature of the brand menu 84 is that a customer 10 can select more than one brand name 126 whereby only the selected brands of shoes are displayed simultaneously in the display window 58 and the corresponding products comparable via the display window. For example, if a customer 10 is interested in shoes of only certain brands such as "A. Marinelli" and "AK Anne Klein", then the brand name 126 corresponding to each of these brands can be selected in the brand menu 84 and the designated products viewed simultaneously in the display window 58. The displayed product images 76 and associated product descriptions 78 can be arranged in accordance with the various product search tools 80 and/or other sort tools available via the display window 58.

Figure 5:
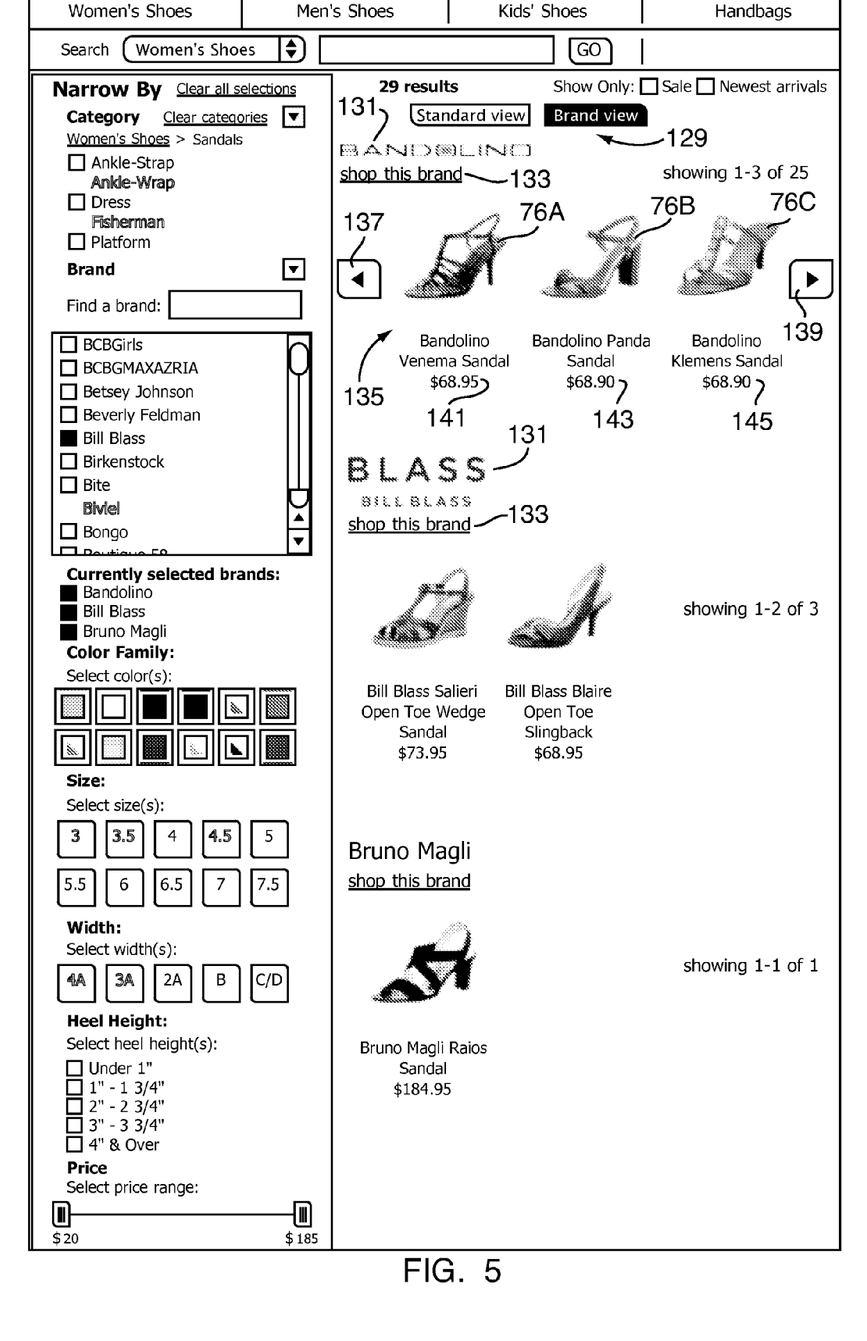
FIG. 5 is an illustration of another embodiment of a product selection screen in accordance with the present disclosure illustrating the display of a plurality of selected brands of products available for purchase.

Referring to FIG. 5, upon selection of one or more brand names 126 via the brand menu 84 the display window 58 is updated to include a standard view/brand view toggle 129 whereby the display window can be switched via a mouse click by the customer 10 between a standard view and a brand view. In the brand view, as shown in FIG. 5, the product images 76 and product descriptions 78 are arranged in the display window 58 sorted by the brand names 126. Whereas, in the standard view (See FIG. 2) all of the selected product images 76 and associated product descriptions 78 are grouped together, regardless of the brand. A brand logo 131 is also displayed above the product images 76 corresponding to each of the displayed brands. Also included in the display window 58 near each brand logo 131 is an associated "shop this brand" icon 133 which is user selectable to update the display window 58 to display only products of the selected brand name 126. Thus, selection of one of the "shop this brand" icons 133 causes the brand menu 84 to clear all selected brand names 126 except the brand name corresponding to the selected "shop this brand" icon. Accordingly, the filter window 56 and display window 58 are refreshed and updated in real time to reflect the revised brand name selection.

Still referring to FIG. 5, if there are more than a predetermined maximum number of images in a selected portion of the available products to be displayed, e.g., three, in the viewer 135 (e.g., there are more than three products identified in the Bandolino® brand), left and right scroll buttons 137, 139, respectively, are displayed in the display window 58 for customer operation of the viewer 135. The maximum number of images in the viewer 135 may be any desired number, depending in part on the size of the product images 76. For example, when the customer 10 selects (clicks on) the right scroll button 139, the images 76A-76C would normally scroll (or index or shift) to adjacent positions to the right, e.g., the image 76C disappears, the image 76B moves to the position 143 (previously occupied by image 76C), the image 76A moves to the position 143, and a new image (not shown) appears in the position 141. When the first of image (e.g., 76A) of a resulting search is displayed in the first position 141 of the viewer 135, (as is the case in the illustrated example) the images 76A-76C do not move to the right, as the viewer 135 includes the first image of the search results in the first viewer position, i.e. position 141. Accordingly, the left scroll button 139 appears in phantom and is not selectable in this position.

Similarly, if the customer 10 clicks on the left scroll button 137, the images 76A-76C all scroll (or index) to the adjacent positions to the left, i.e., the image 76A disappears, the image 76B moves to the position 141 (previously occupied by the image 76A), the image 76C moves to the position 143, and a new image (not shown), indicative of the next product in the results list (i.e. product no. 4 of 25), appears in the position 145. When the last item on the list is displayed in the last position 145 of the viewer 135, the images 76A-76C do not move to the left, as the viewer 135 is at the bottom of the list. Instead of an index-type scroll described above where there are preset positions for each image, a smooth or continuous scroll may be used, in which case there are no fixed positions for the images 76A-76 C in the viewer 135 and the images 76A-76C scroll continuously across the viewer window 135 in the desired direction based on the selection of the scroll buttons 137, 139.

Referring again to FIG. 2, the color family table 86 provides a plurality of individually selectable color icons 130 each bearing a color representative of a color of a women's shoe available via the website 22. Thus, the color family table 86 provides one of the product search tools 80 whereby the products available on the website 22 can be searched by color. Multiple color icons 130 represent various multi-colored and color combinations of products available. Each of the color icons 130 are selectable for displaying the available products of the selected color or multi-color via the display window 58. One or more of the color icons 130 can be selected wherein the display window 58 is updated to display all of the selected products available on the website 22 which are of the colors selected via the color icons 130. For example, if a customer 10 is only interested in brown or black shoes, then the color icons 130 corresponding to both brown and black can be selected whereby the display window 58 is updated in real time to display only shoes which are brown and black and meet any other criteria identified in conjunction with the other product search tools 80 and/or the sort tools provided via the display window.

As shown in FIG. 3, the color family table 86 interacts in real time with the other product search tools 80 and sort tools available via the display window 58. Thus, once other search criteria has been selected, the color family table 86 is updated in the filter window 56 to reflect the colors of shoes available corresponding to any customer selections or sort criteria entered. For example, as shown in FIG. 3, the second row of color icons 130 identified in the color family table 86A with the reference numeral 132 each include only a portion of a color block indicating that the corresponding colors are unavailable in the selected category, namely, Mules & Clogs. In other embodiments of the color family table 86, the colors icons 130 can be identified in various other ways to indicate whether or not a corresponding color is available in the selected products. For example, the color icon 130 identifying a color not available in a selected product could be displayed with an X superimposed over the image of the color icon.

Referring again to FIG. 2, the size table 88 includes a plurality of size icons 134 each including a reference number indicative of a shoe size 136. The size icons 134 are selectable individually or in any combination thereof to limit the products displayed on the display window 58 to those products available in at least one of the selected shoe sizes. The size icons 134 include an identifier to indicate the corresponding shoe size is unavailable via the website 22. For example, as shown in FIG. 2, the size icon 134A includes a shoe size "3" displayed in a different font than the shoe size "5.5" disposed in the size icon 134B indicating the shoe size 3 is not available in the selected style(s) of shoes. Whereas the selected shoes are available in the shoe size 5.5. In other embodiments of the size table 88, other means of identifying whether or not certain sizes of shoes are available in a selected style can be utilized including, for example, wherein the colors of the shoe sizes and/or size icons for the shoe sizes available versus unavailable are distinguishable therebetween.

Referring again to FIG. 2, the filter window 56 also provides a width table 90 which includes a plurality of width icons 140 each including a width identifier 142. The width icons 140 are individually selectable by a customer 10 via a mouse click to limit the products displayed in the display window 58 to those which are available in at least one of the widths selected in the width table 90. Upon selection of one or more of the width icons 140, the display window 58 is automatically updated in real time to display only the products of the selected styles which are available in widths corresponding to any selected width icons 140. Upon selection of a width icon 140 the width table 90 is updated to mark the selected width icon in some way such that the selected status thereof is distinguishable from an unselected width icon. A mouse click on a selected width icon 140 will deselect the width icon causing the display window 58 to be updated to reflect the revised width criteria selected. If none of the width icons 140 are selected the display window 58 will include all of the selected products available.

For example, if a customer 10 has is only interested in shoes which are available in an "A" or "B" width, the width table 90 can be utilized to select the width icons 140A and 140B corresponding to "A" and "B" widths respectively. Upon selection of the width icons 140A and 140B, the display window 58 is automatically updated to display only those product images 76 and associated product descriptions 78 corresponding to the selected styles of shoes which are available in at least one of the widths "A" and "B". Once selected, the filter window 56 is updated to display the selected width icons 140A and 140B including an outline or some type of highlighting or mark so that the selected status thereof is distinguishable from those width icons 140 which have not been selected.

The width icons 140 also provide an indicator as to the availability of the selected products in the associated widths. As shown in FIG. 2, the width identifier 142A is shown in an outlined font indicating that the width "4A" is not available for the selected shoes and the associated width icon 140 is not selectable. In other embodiments of the width table 90, the entire width icon 140 is displayed in phantom or a lighter grey tone indicating that the corresponding width is not available for the selected shoes. As set forth above, the width icon 140 for unavailable widths is not selectable wherein a mouse click thereon will provide no result.

Still referring to FIG. 2, the heel height table 92 allows a customer 10 to limit the shoes displayed on the display window 58 to those having a heel height in one or more selected ranges. The heel height table 92 includes a plurality of individually selectable range identifiers 150 each having an associated selection box 110 corresponding thereto. In one preferred embodiment the ranges of heel heights are selectable via a mouse click directly on a desired range identifier 150 or by clicking the associated selection box 110. In the illustrated example, the range identifiers 150 include the following ranges of shoe widths: under 1"; 1"-1¾"; 2"-2¾"; 3"-3¾"; and 4" and over. Other ranges of shoe widths may be used.

Selection of one or more of the range identifiers 150 or an associated selection box 110 causes the display window 58 to be updated in real time to limit the displayed shoes to those available having the selected heel sizes. For example, if the range identifiers 150 for the ranges under 1" and 1"-1¾" are selected then the display window 58 will be updated in real time to display all of the selected shoes which are available having a heel height of 1¾" and under.

Still referring to FIG. 2, the price range selector 94 includes a sliding scale 154 having a minimum price slider 156 and corresponding minimum price identifier 158 as well as a maximum price slider 160 and corresponding maximum price identifier 162. The minimum and maximum price sliders 156, 160 are operable by a customer 10 via dragging the sliders with a mouse (not shown) coupled to the computer 14 to limit the shoes displayed on the display window 58 to those in a selected price range. For example, to display in the display window 58 only the selected shoes priced in a range between $50 and $150, a customer 10 moves the minimum price slider 156 towards the right side of the filter window 56 until the minimum price identifier 158 is set to $50. Similarly, the maximum price slider is moved towards the left side of the filter window 56 until the maximum price identifier is set to $150. Thus, as the minimum and maximum price sliders 156 and 160 are moved, the corresponding minimum and maximum price identifiers 158, 162 respectively are updated in real time. Additionally, in response to changing the price range selector 94 as set forth above, the display window is also updated in real time to include a product image 76 and/or product description 78 for only the selected products within the price range selected via the price range selector 94.

In the illustrated embodiment, the price range selector 94 includes a minimum and maximum prices of $25 and $625 respectively indicative of the full range of price of all products currently displayed. Alternatively, the price range selector 94 can be adjusted with respect to the predetermined minimum and maximum prices in accordance with the prices of the products offered on the website 22.

The product search tools 80 displayed in the filter window 56 as well as the sort tools 112 and 116 disposed on the display window 58A are interactive one with the other such that the displays associated with each of the search and sort tools is updated in real time to reflect a selection made using any of the search or sort tools.

Figure 4:
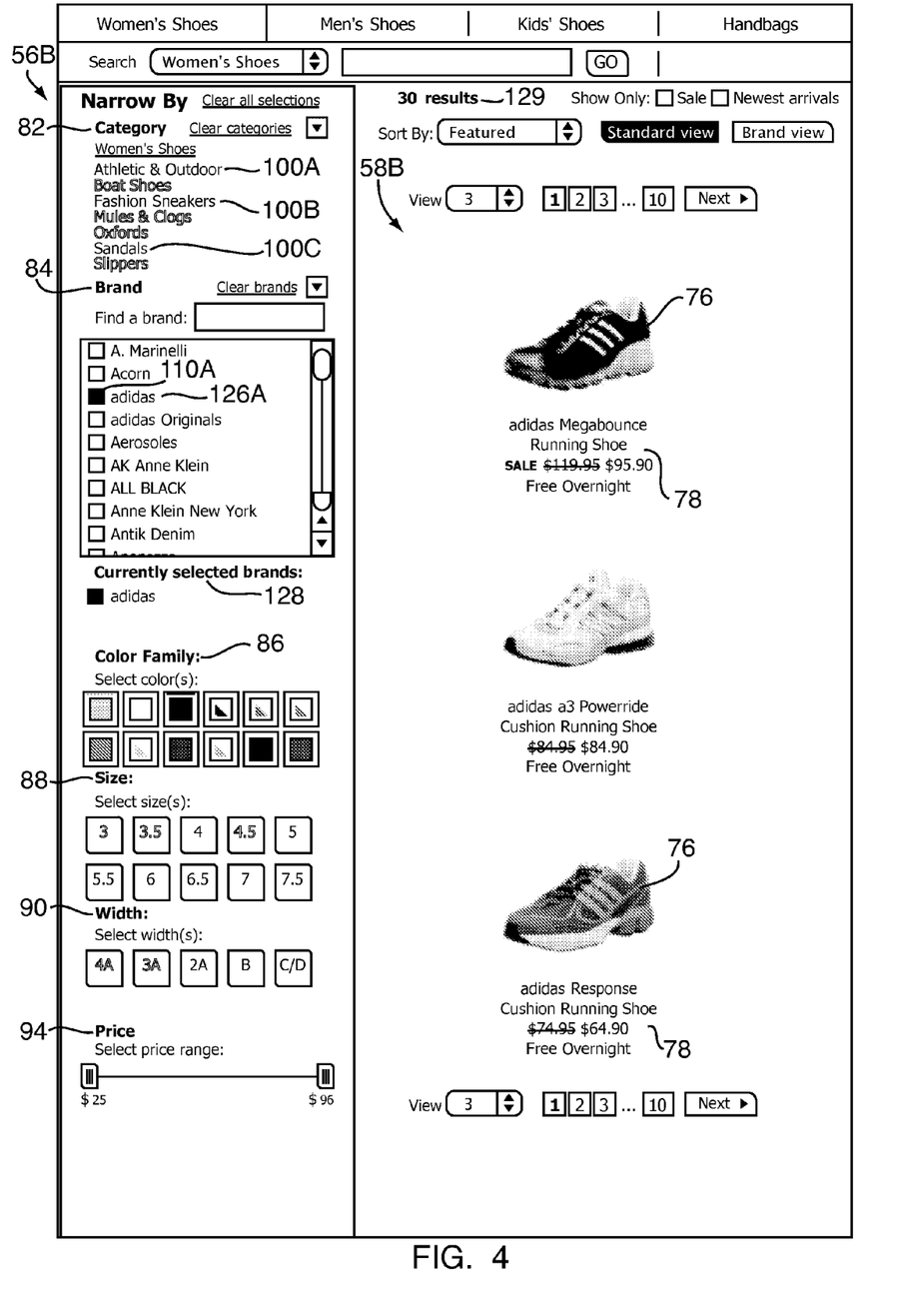
FIG. 4 is an illustration of another embodiment of a product selection screen in accordance with the present disclosure illustrating the display of a selected brand of products available for purchase.

For example, as shown in FIG. 4, if a customer selects the brand Adidas® in the brand menu 84, the product search tools 80 in the filter window 56B are updated in real time as follows:

The category menu 82 is updated to identify in bold only those categories in which Adidas® brand shoes are available on the website 22 (e.g., The category identifiers 100A: Athletic & Outdoor; 100B: Fashion Sneakers; and 100C: Sandals; are each displayed in bold type). The remaining category identifiers are displayed in phantom or light text. Further, only the highlighted categories are user-selectable to further limit the products displayed on the display window 58B.

The brand menu 82 is updated to identify in bold type only the brand name 126A identifying the selected Adidas® brand. The selection box 110A associated with the Adidas® brand is marked.

The selected brands list 128 is updated to include only the selected brand name, namely Adidas®.

The color family table 86 is updated to identify the colors of the Adidas® brand shoes available through the website 22.

The size table 88 is updated to identify the sizes of the Adidas® brand shoes available through the website 22.

The width table 90 is updated to identify the widths of the Adidas® brand shoes available through the website 22.

The heel height table 92 is deleted from the filter window 56 as heel height is not applicable to any of the selected Adidas® brand shoes available through the website 22.

The price range selector 94 is updated to identify the minimum and maximum prices of all of the Adidas® brand shoes available through the website 22.

Still referring to FIG. 4, the display window 58B is also updated in real time to reflect the selection of the Adidas® brand in the filter window 56 including:

Updating the display window 58B to include the product image 76 and product description 78 of each style of Adidas® brand shoes available through the website 22.

Updating a results identifier 165 to indicate how many styles of Adidas® brand shoes are available through the website 22.

Displaying the standard/brand view toggle 129.

Accordingly, each time one of the product selection tools 80 or another sort tool is utilized by a customer 10 to initiate or narrow a product search, both of the filter window 56 and display window 58 are updated in real time to reflect the current search or sort criteria entered. There is no required order of use of the product selection tools 80. For example, upon viewing the product selection screen 50, a customer 10 can immediately utilize the brand menu 84 to select one or more brand of shoes he/she is interested in viewing and/or purchasing. In response, the filter window 56 is updated in real time to identify those brands selected; all other brand names are displayed in phantom or a lighter font such that the brands appear unselected. Additionally, each of the other product selection tools 80 which have not been set by a customer 10 are also updated in accordance with the brands selected; e.g., the category menu 82 is updated to identify only those categories of shoes available in the selected brands; the color family selector 86 is updated to identify only those colors of shoes available in the selected brands. (Thus, if the manufacturers of the selected brands do not make white shoes, the color icon 130 identifying the color white will be displayed as not selectable thereby indicating that white shoes are not available.) On the other hand, if the price range selector 94 has already been set to identify a certain price range by the customer 10, then the price range selector 94 will not be reset pursuant to the subsequent brand menu 84 selections but will remain and limit the brand search to display only shoes in the selected brands within the pre-selected price range.

Figure 8:
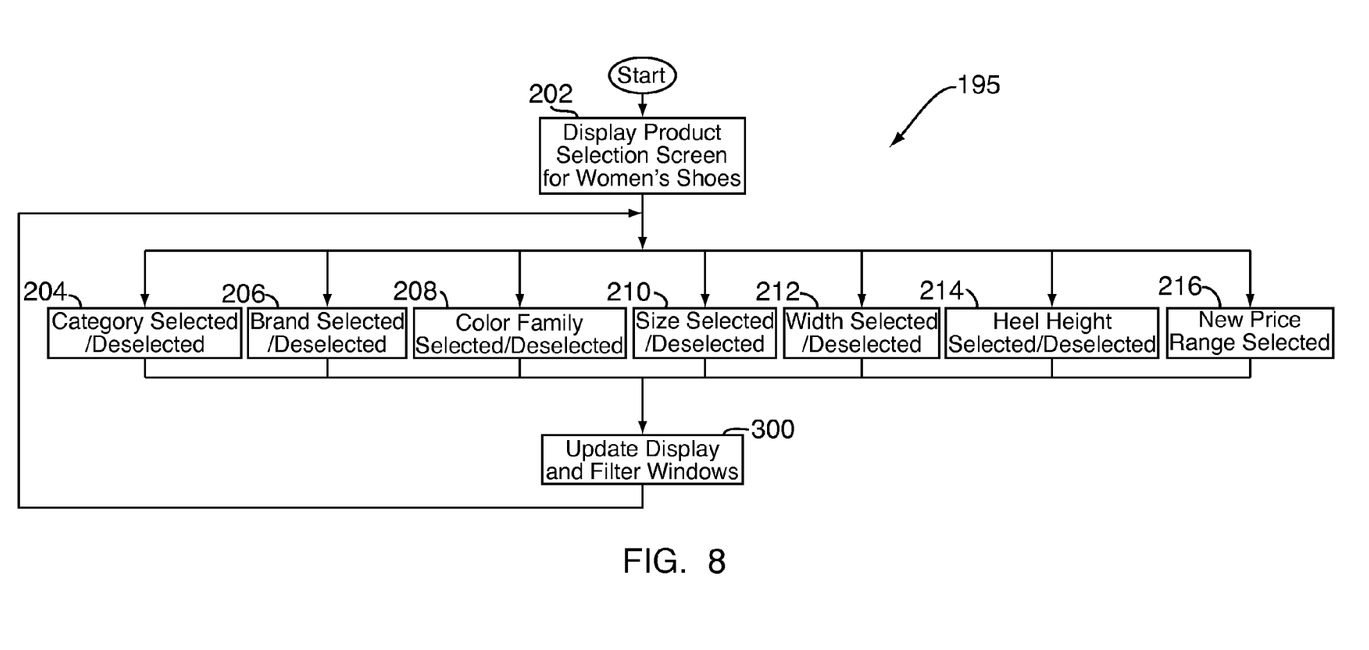
FIG. 8 is a flow chart of another embodiment of a process for displaying a plurality of products for customer review and comparison in accordance with the system and method of the present disclosure.

Referring to FIG. 8, a flow chart 195 illustrates one embodiment of a process for displaying a plurality of products for customer review and comparison in accordance with the system and method of the present invention. The process begins at block 202 wherein a product selection screen 50 (See FIG. 2) including a filter window 56 and display window 58 for a selected product such as women's shoes. In a normal state, prior to any customer 10 use of the product selection tools 80 or product sort tools, the process includes displaying a filter window 56 directed to a "home page" for women's shoes and a display window 58 displaying local advertisements 73 and featured products 74. The process continues at one of blocks 204, 206, 208, 210, 212, 214, 216, with the customer 10 selection/deselection of one of a Category, Brand, Color Family, Size, Width Range, Heel Height, and Price Range, via one of the corresponding product selection tools 80. Following use of one of the product selection tools 80, the process continues at block 300 wherein the filter window 56 and display window 58 is updated as discussed further herein below. Following updating of the filter window 56 and display window 58 at block 300, the process loops and continues again at one of blocks 204, 206, 208, 210, 212, 214, 216, pursuant to a next customer selection/deselection via one of the corresponding product selection tools 80 as set forth above. As illustrated in FIG. 8, each of the product selection tools 80 can be utilized by a customer 10 in any order with or without the use of another of the product selection tools.

The screens for both the filter window 56 and display window 58 are updated such that a new window (or screen section) is displayed within a currently displayed HTML page, web page or browser screen (and, thus, no new HTML page, web page, or browser screen is generated). Thus, each time one of the product selection tools 80 or one of the sort tools provided in the display window 58 is utilized by a customer 10, the filter window 56 and display window 58 is updated in response to the customer selection within the same browser screen or web page. This method is to be distinguished from other conventional techniques, where a new HTML page(s) is generated and opened over an existing page each time an icon, link or other selectable item is chosen by a user.

One key feature of the present disclosure is that many of the product selection tools 80 allow a customer to choose more than one selection such that various products can be displayed simultaneously in a common display window 58 for comparison therebetween. For example, using both the category menu 82 and the brand menu 82, a customer can select a category identifier 100 for "Sandals" and brand names 126 for the brand names "Bandolino" and "Anne Klein New York" which causes the display window 58 to be updated in real time to display only the available products meeting these selected criteria. Thus, in this example, the display window 58 is updated in real time to display only Sandals carrying the brand names "Bandolino" and "Anne Klein New York". As set forth above, the sort tools available directly from the display window 58 allow the displayed product images 76 and associated product descriptions 78 to be grouped together in a standard view or sorted by brand and displayed in a brand view. The toggle 129 being selectable to view the displayed products in either the standard or brand views.

While the product selection tools 80 and other sort tools described herein illustrate some of the product selection methods that may be implemented with the present disclosure, it should be understood that many other or different selection and sort tools and/or selection or sort criteria may be used for and/or with the present disclosure.

Figure 6:
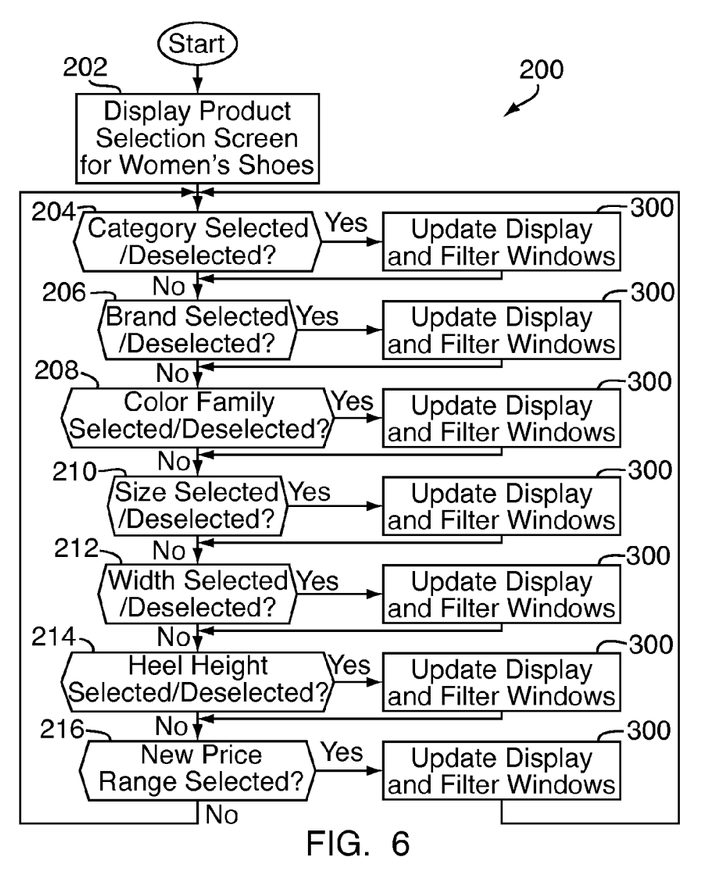
FIG. 6 is a flow chart of one embodiment of a process for displaying a plurality of products for customer review and comparison in accordance with the system and method of the present disclosure.

Referring to FIG. 6, a flow chart 200 illustrates another embodiment of a process for displaying a plurality of products for customer review and comparison in accordance with the system and method of the present disclosure. The process begins at a block 202 by displaying a product selection screen 50 (See FIG. 2) including a filter window 56 and display window 58 for a selected product such as women's shoes. In a normal state, prior to any customer use of the product selection or sort tools, the process includes displaying a filter window 56 directed to a "home page" women's shoes and a display window 58 displaying local advertisements 73 and featured products 74. The process continues at block 204 wherein a determination is made as to whether or not a category identifier 100 or new category identifier has been selected or deselected. If yes the process proceeds to block 300 wherein the display and filter windows are updated as discussed further herein below.

If no category identifier 100 has been selected/deselected or following the updating of the display and filter windows pursuant to a category selection, the process continues at block 206 wherein a determination is made as to whether or not a brand name(s) 126 or new brand name(s) has been selected or deselected. If yes the process proceeds to block 300 wherein the display and filter windows are updated according to the brand name selections made.

If no brand name 126 has been selected/deselected or following the updating of the display and filter windows pursuant to a brand name selection, the process continues at block 208 wherein a determination is made as to whether or not a color icon 130 has been selected or deselected. If a color icon 130 has been selected the process proceeds to block 300 wherein the display and filter windows are updated according to any color selections made. Thereafter, the process continues at block 210.

If no color icon 130 has been selected/deselected or following the updating of the display and filter windows pursuant to a color selection, the process continues at block 210 wherein a determination is made as to whether or not a size icon 134 has been selected or deselected. If yes the process proceeds to block 300 wherein the display and filter windows are updated according to any size selections made. Thereafter, the process continues at block 212.

If no size icon 134 has been selected/deselected or following the updating of the display and filter windows pursuant to a size selection, the process continues at block 212 wherein a determination is made as to whether or not a width icon 140 has been selected or deselected. If yes the process proceeds to block 300 wherein the display and filter windows are updated according to any width selections made. Thereafter, the process continues at block 214.

If no width icon 140 has been selected/deselected or following the updating of the display and filter windows pursuant to a width selection, the process continues at block 214 wherein a determination is made as to whether or not a heel height range identifier 150 has been selected or deselected. If yes the process proceeds to block 300 wherein the display and filter windows are updated according to any heel height ranges selected. Thereafter, the process continues at block 216.

If no heel height range identifier 150 has been selected/deselected or following the updating of the display and filter windows pursuant to a heel height selection, the process continues at block 216 wherein a determination is made as to whether or not a price range or new price range has been selected via the price range selector 94. If yes the process proceeds to block 300 wherein the display and filter windows are updated according to the price range or new price range selected. Thereafter, the process loops to block 204 and starts over checking each of the product selection tools 80 for the current selections.

If no price range or new price range is selected, the process returns to block 204 and starts over checking each of the product selection tools 80 for the current selections.

Figure 7:
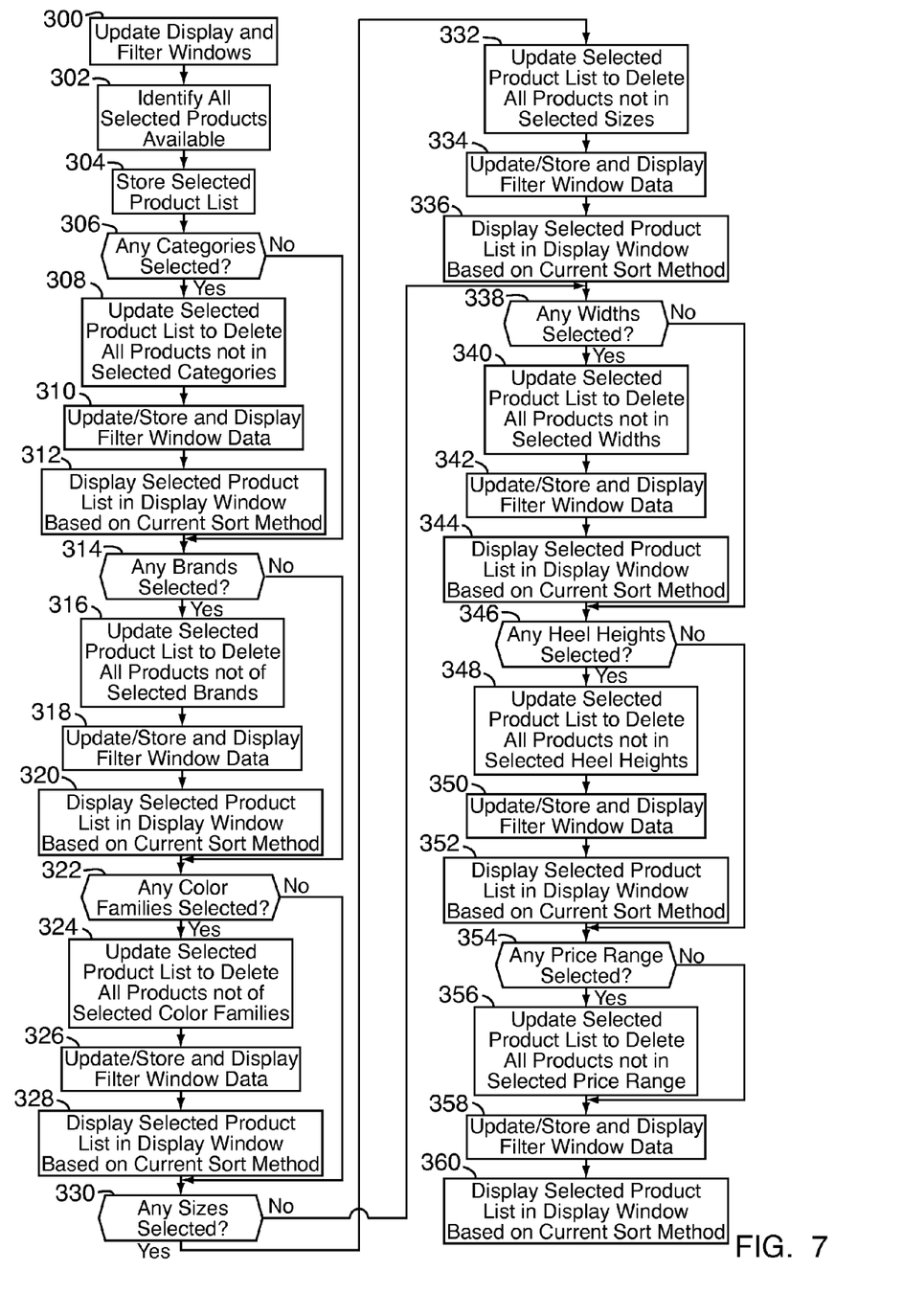
FIG. 7 is a flow chart of one embodiment of a process for updating a product display and filter windows in response to customer selection and sort requests according to the system and method of the present disclosure.

Referring to FIG. 7, the process of updating the display window 58 and filter window 56 begins at block 300 and continues at block 302 wherein a database associated with the merchant server 24 for the website 22 is queried and all products available through the website 22 of a customer selected product type are identified and stored in memory together with associated images and information for each product at block 304. The information and images associated with each product currently selected is referred to herein collectively as "Selected Products Data".

The process continues at block 306 wherein a determination is made as to whether or not a category identifier 100 has been selected. If none of the category identifiers have been selected, the process jumps to box 314. If one or more category identifiers 100 have been selected the process continues at block 308 wherein the Selected Products Data is retrieved and updated to delete therefrom all information related to products not in a selected category.

The process continues at block 310 wherein the Selected Products Data is searched with respect to the features associated with each of the product search tools 80 for updating the filter window 56 with respect to the products selected. The information pertaining to the current products selected and associated with each of the product selection tools 80 is collectively referred to herein as "Filter Window Data".

For example, if the currently selected products range in price from $35 to $350, the process at block 310 includes scanning the Selected Products Data for the prices of each of the selected products and storing the minimum price retrieved ($35) and the maximum price retrieved ($350) as Filter Window Data and updating and displaying the price range selector 94 accordingly. The same process is repeated for updating the Filter Window Data and displaying each of the product search tools 80 provided in the filter window 56 with respect to the products currently selected and the Selected Products Data therefor.

At block 312, the process continues with sorting the Selected Products Data pursuant to any currently selected sort criteria such as "Price—low to high", "Best selling" or "Newest arrivals" or by brand in a brand view. Still referring to block 312, the process includes displaying the Selected Products Data including both a product image 76 and associated product description 78 for each currently selected product in accordance with the sorted order or arrangement thereof.

The process continues at block 314 wherein a determination is made as to whether or not a brand name 126 has been selected. If none of the brand name(s) 126 have been selected, the process jumps to box 322. If one or more brand names 126 have been selected the process continues at block 316 wherein the Selected Products Data is retrieved and updated to delete therefrom all information related to products not of a selected brand.

The process continues at block 318 wherein the Selected Products Data is searched with respect to the features associated with each of the product search tools 80 for updating the Filter Window Data with respect to the products selected and displaying each of the product search tools 80 provided in the filter window 56 with respect to the products currently selected and the corresponding Filter Window Data.

At block 320, the process continues with sorting the Selected Products Data pursuant to any currently selected sort criteria. Still referring to block 320, the process includes displaying the Selected Products Data including both a product image 76 and associated product description 78 for each currently selected product in accordance with the sorted order or arrangement thereof.

The process continues at block 322 wherein a determination is made as to whether or not a color icon 130 has been selected. If none of the color icons 130 have been selected, the process jumps to box 330. If one or more color icons 130 have been selected the process continues at block 324 wherein the Selected Products Data is retrieved and updated to delete therefrom all information related to products not of a selected color family.

The process continues at block 326 wherein the Selected Products Data is searched with respect to the features associated with each of the product search tools 80 for updating the Filter Window Data with respect to the products selected and displaying each of the product search tools 80 provided in the filter window 56 with respect to the products currently selected and the corresponding Filter Window Data.

At block 328, the process continues with sorting the Selected Products Data pursuant to any currently selected sort criteria. Still referring to block 328, the process includes displaying the Selected Products Data including both a product image 76 and associated product description 78 for each currently selected product in accordance with the sorted order or arrangement thereof.

The process continues at block 330 wherein a determination is made as to whether or not a size icon 134 has been selected. If none of the size icons 134 have been selected, the process jumps to box 338. If one or more color icons 130 has been selected the process continues at block 332 wherein the Selected Products Data is retrieved and updated to delete therefrom all information related to products not available in a selected size.

The process continues at block 334 wherein the Selected Products Data is searched with respect to the features associated with each of the product search tools 80 for updating the Filter Window Data with respect to the products selected and displaying each of the product search tools 80 provided in the filter window 56 with respect to the products currently selected and the corresponding Filter Window Data.

At block 336, the process continues with sorting the Selected Products Data pursuant to any currently selected sort criteria. Still referring to block 336, the process includes displaying the Selected Products Data including both a product image 76 and associated product description 78 for each currently selected product in accordance with the sorted order or arrangement thereof.

The process continues at block 338 wherein a determination is made as to whether or not a width icon 140 has been selected. If none of the width icons 140 have been selected, the process jumps to box 346. If one or more width icons 140 have been selected the process continues at block 340 wherein the Selected Products Data is retrieved and updated to delete therefrom all information related to products not available in a selected width.

The process continues at block 342 wherein the Selected Products Data is searched with respect to the features associated with each of the product search tools 80 for updating the Filter Window Data with respect to the products selected and displaying each of the product search tools 80 provided in the filter window 56 with respect to the products currently selected and the corresponding Filter Window Data.

At block 344, the process continues with sorting the Selected Products Data pursuant to any currently selected sort criteria. Still referring to block 344, the process includes displaying the Selected Products Data including both a product image 76 and associated product description 78 for each currently selected product in accordance with the sorted order or arrangement thereof.

The process continues at block 346 wherein a determination is made as to whether or not a heel height range identifier 150 has been selected. If none of the range identifiers 150 have been selected, the process jumps to box 354. If one or more range identifiers 150 have been selected the process continues at block 348 wherein the Selected Products Data is retrieved and updated to delete therefrom all information related to products not available within the selected heel height ranges.

The process continues at block 350 wherein the Selected Products Data is searched with respect to the features associated with each of the product search tools 80 for updating the Filter Window Data with respect to the products selected and displaying each of the product search tools 80 provided in the filter window 56 using the current Filter Window Data.

At block 352, the process continues with sorting the Selected Products Data pursuant to any currently selected sort criteria. Still referring to block 352, the process includes displaying the Selected Products Data including both a product image 76 and associated product description 78 for each currently selected product in accordance with the sorted order or arrangement thereof.

The process continues at block 354 wherein a determination is made as to whether or not the price range selector 94 has been adjusted to specify a desired price range. If a price range has not been identified, the process jumps to box 358. If a desired price range has been selected via the price range selector 94, the process continues at block 356 wherein the Selected Products Data is retrieved and updated to delete therefrom all information related to products not available within the selected price range.

The process continues at block 358 wherein the Selected Products Data is searched with respect to the features associated with each of the product search tools 80 for updating the Filter Window Data with respect to the products selected and displaying each of the product search tools 80 provided in the filter window 56 using the current Filter Window Data.

At block 360, the process continues with sorting the Selected Products Data pursuant to any currently selected sort criteria. Still referring to block 360, the process includes displaying the Selected Products Data including both a product image 76 and associated product description 78 for each currently selected product in accordance with the sorted order or arrangement thereof.

Thus, each time one of the product search tools 80 or one of the sort tools provided is utilized by a customer 10 to revise the current search and/or sort criteria, the selected products are updated accordingly and displayed in the display window 58 in real time. Additionally, the filter window 56 setting forth the search criteria and the corresponding features of the currently selected products is updated and displayed in real time in response to any customer selections. The flow charts 200 and 300 identify one embodiment of a process in accordance with the present disclosure for displaying the filter window 56 and display window 58 pursuant to customer entered search and sort criteria.

It should be understood that it is not important for the present disclosure how the customer 10 actually purchases or obtains the desired item. For example, the desired item may be obtained by the customer 10 using the computer 14 and the network 18 or off-line without the use of the computer 14 or network 18, e.g., via telephone, fax, mail, in person, CD, or DVD, or the like.

Also, for any of the drop-down menus or pop-over menus described herein, instead or in addition to the options being displayed in text format, one or more of the options may be displayed as visual images or icons.

Further, the various displays, screen illustrations, and user interfaces described herein, are displayed on the customer computer 14 and are either generated by the merchant website server 24 and sent via the network 18 to the customer computer 14 or are generated by software stored in the customer computer 14 sent from the merchant website server. In either case, content displayed on the customer computer 14 when connected to the merchant website is a result of or caused by information or data generated by the merchant website server 24 and sent to the customer computer 14. Therefore, content displayed from the merchant website 22 on the customer computer 14 shall be deemed herein to be displayed by the merchant website 22.

Although the disclosure has been described herein using exemplary techniques, algorithms, and/or processes for implementing the present disclosure, it should be understood by those skilled in the art that other techniques, algorithms and processes or other combinations and sequences of the techniques, algorithms and processes described herein may be used or performed that achieve the same function(s) and/or result(s) described herein and which are included within the scope of the present disclosure.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods described herein in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present invention and protected by the following claims.

At least the following is claimed:

1. A computer-implemented method for causing the display of a plurality of products, the method comprising:
    causing the display of a plurality of product selection tools on a computer display, wherein each product selection tool is adapted to accept a customer selection of two or more features of a plurality of available products, a second or subsequent feature not depending on a previously selected feature, thereby causing the display of images of a portion of said available products including at least one of said two or more features on a computer display;
    causing the display of at least one sorting tool whereby a customer can select a sort preference for said displayed products on the computer display;
    accepting a customer selection of said features or said sort preference for said portion of available products to be displayed;
    identifying a portion of said available products based on said customer selection;
    causing the display of said images of said portion of said available products arranged pursuant to said sort preference on the computer display; and
    updating said display of said plurality of product selection tools including identifying said customer selections associated therewith.

2. The method of claim 1 wherein each of said plurality of product selection tools corresponds to a product characteristic selected from the group consisting of: style, brand, color, size, width, category, heel height, and price.

3. The method of claim 2 wherein said customer selection includes selecting two or more features corresponding to one of said product characteristics.

4. The method of claim 3 wherein said two or more features includes a plurality of brand names and said sorting said portion of said available products includes sorting said products by said selected brand names.

5. The method of claim 1 further comprising updating the display of at least one of said product selection tools according to the features of said portion of available products identified in response to a customer selection associated with another of said product selection tools.

6. The method of claim 1 further comprising sorting said portion of available products based on one of said features.

7. A computer-implemented method for causing the display of a plurality of products for customer review and comparison on a computer display, the method comprising:
    causing the display of a product selection tool, including the display of a group of features associated with at least a portion of a plurality of available products on the computer display;
    accepting a customer selection of two or more of said features, a second or subsequent feature not depending on a previously selected feature;
    identifying a portion of said available products based on said customer selection;
    causing the display of an image of each of the products of said portion said available products on the computer display; and
    updating said display of said product selection tool including identifying said customer selections associated therewith.

8. The method of claim 7 further comprising causing the display of at least one sorting tool on the computer display, whereby a customer can select a sort preference for said displayed products.

9. The method of claim 8 wherein said features includes a plurality of brand names and said sort preference includes sorting said portion of available products by brand name.

10. The method of claim 7 wherein said product selection tool corresponds to one of a group of product characteristics selected from the group consisting of: style, brand name, color, size, width, category, heel height, and price.

11. A computer system having a computer that has stored thereon a computer program, and executes said computer program, said computer program for displaying images of items available for purchase by a customer from a merchant, the computer program causing the computer system to perform a method, comprising:
    causing the display of a product selection tool, including the display of a group of features associated with at least a portion of a plurality of available products;
    accepting a customer selection of two or more of said features, a second or subsequent feature not depending on a previously selected feature;
    identifying a portion of said available products based on said customer selection; and
    causing the display of an image of each of the products of said portion of said available products.

12. The system of claim 11 wherein the method includes causing the display of at least one sorting tool whereby a customer can select a sort preference for said displayed products.

13. The system of claim 11 wherein said product selection tool corresponds to one of a group of product characteristics selected from the group consisting of: style, brand name, color, size, width, category, heel height, and price.

14. The system of claim 11 further comprising updating said display of said product selection tool based on a first of said features selected.

15. A non-transitory computer readable medium having stored thereon sequences of instructions which, when executed by a processor, cause the processor to perform the steps of:

causing the display of a product selection tool including displaying a group of features, each said feature associated with at least a portion of a plurality of available products;

accepting a customer selection of two or more of said features, a second or subsequent feature not depending on a previously selected feature;

identifying a portion of said available products based on said customer selection; and causing the display of an image of each of the products of said portion of said available products.

* * * * *